United States Patent
Feng et al.

(10) Patent No.: US 11,967,326 B2
(45) Date of Patent: Apr. 23, 2024

(54) DECT BASE STATION, HANDLE AND COMMUNICATION SYSTEM

(71) Applicant: YEALINK (XIAMEN) NETWORK TECHNOLOGY CO., LTD., Fujian (CN)

(72) Inventors: Wanjian Feng, Fujian (CN); Zhipeng Lin, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 247 days.

(21) Appl. No.: 17/037,975

(22) Filed: Sep. 30, 2020

(65) Prior Publication Data

US 2021/0383814 A1 Dec. 9, 2021

(30) Foreign Application Priority Data

Jun. 5, 2020 (CN) .......................... 202010509888.7

(51) Int. Cl.
| G10L 15/00 | (2013.01) |
| G10L 19/005 | (2013.01) |
| H04W 88/08 | (2009.01) |

(52) U.S. Cl.
CPC ........... *G10L 19/005* (2013.01); *H04W 88/08* (2013.01)

(58) Field of Classification Search
CPC . G10L 19/005; H04W 88/08; H04M 1/72505; H04M 2250/08
See application file for complete search history.

(56) References Cited

U.S. PATENT DOCUMENTS

| 10,097,594 | B1* | 10/2018 | Filart | ..................... H04L 65/70 |
| 2007/0243898 | A1* | 10/2007 | Eyre | .................... H04M 1/575 |
| | | | | 455/552.1 |
| 2012/0190370 | A1* | 7/2012 | Takagi | ................... H04W 36/18 |
| | | | | 455/437 |
| 2015/0072661 | A1* | 3/2015 | May-Weymann | ...... H04W 4/16 |
| | | | | 455/414.1 |
| 2016/0191093 | A1* | 6/2016 | Larsen | ................ H04M 1/6066 |
| | | | | 455/41.2 |
| 2019/0387090 | A1* | 12/2019 | Ishihara | ............... H04M 11/066 |

OTHER PUBLICATIONS

B. Ramamurthi and C. Mathiazhagan, "DECT-based wireless local loop system," Proceedings of 1994 International Conference on Personal Wireless Communications, 1994, pp. 55-59, doi: 10.1109/ICPWC.1994.567913. (Year: 1994).*

ETSI TS 102 527-1: "Digital Enhanced Cordless Telecommunications (DECT); New Generation DECT; Part 1: Wideband speech" (Year: 2019).*

* cited by examiner

*Primary Examiner* — Paras D Shah

(57) ABSTRACT

Disclosed are a Digital Enhanced Cordless Telecommunications (DECT) base station, a handset and a communication system. The DECT base station is installed with at least two different voice codecs and is configured to sequentially judge whether the voice codecs of the DECT base station match voice codecs of a handset according to a first codec information data packet sent by the handset, and when a matching is successful, send a response information to the handset to perform voice communication with the handset through a matched voice codec. By using the DECT base station can guarantee the normal voice communication between the DECT base station and the handset in the condition of installing voice codecs in the DECT base station.

6 Claims, 3 Drawing Sheets

DECT BASE STATION, HANDLE AND COMMUNICATION SYSTEM

CROSS-REFERENCE TO RELATED APPLICATIONS

The present application claims the benefit of Chinese Patent Application No. 202010509888.7 filed on Jun. 5, 2020, the contents of which are hereby incorporated by reference.

FIELD OF THE INVENTION

The present disclosure relates to the technical filed of mobile communication, and is more particularly concerned with a Digital Enhanced Cordless Telecommunications (DECT) base station, handset and communication system.

BACKGROUND OF THE INVENTION

Currently, in order to improve the market competitiveness of DECT base station and handset, it is necessary to continuously upgrade DECT base station and handset according to user's needs to improve the performance of DECT base station and handset. For example, according to the user's requirements to sound quality, a new voice codec is installed in the DECT base station and the handset. However, in fact, not all users will purchase or use the DECT base station and the handset installed with new voice codec. When a new DECT base station is equipped with an old handset or a new handset is equipped with a old DECT base station, since the new DECT base station is not compatible with the old handset and the old DECT base station is not compatible with the new handset, it's difficult for the DECT base station and the handset to perform normal voice communication.

SUMMARY

To overcome the defects of the prior art, the present disclosure provides a DECT base station, handset and communication system, which can ensure the normal voice communication between the DECT base station and the handset under the condition of adding voice codec in the DECT base station.

To solve the above technical problems, in the first aspect, an embodiment of the present disclosure provides a DECT base station which is installed with at least two voice codecs;

the DECT base station is configured to sequentially judge whether the voice codecs of the DECT base station match the voice codec of the handset according to the first codec information data packet sent by the handset, and when the matching is successful, send a response information to the handset to perform voice communication with the handset through the matched voice codec.

Further, the DECT base station is further configured to send the second codec information data packet to the handset, enable the handset to sequentially judge whether the voice codecs of the handset match the voice codec of the DECT base station according to the second codec information data packet, and when the matching is successful, receive a response information sent by the handset to perform voice communication with the handset through the matched voice codec.

Further, that sequentially judge whether the voice codecs of the DECT base station match the voice codec of the handset according to the first codec information data packet sent by the handset, specifically is:

according to the first codec information data packet, judge whether the voice codecs of the DECT base station match the voice codec of the handset one by one based on the priority order of the voice codecs of the DECT base station.

Further, that sequentially judge whether the voice codecs of the handset match the voice codec of the DECT base station according to the second codec information data packet, specifically is:

according to the second codec information data packet, judge whether the voice codecs of the handset match the voice codec of the DECT base station one by one based on a priority order of the voice codecs of the handset.

Further, the first codec information data packet is a data packet including the information of the voice codecs of the handset sent by the handset when the handset is turned on or when the communication is established.

Further, the second codec information data packet is a data packet including the information of the voice codecs of the DECT base station sent by the DECT base station when the DECT base station is turned on or when the communication is established.

In the second aspect, the present disclosure provides a handset which is installed with at least two voice codecs;

the handset is configured to send the first codec information data packet to the DECT base station, enable the DECT base station to sequentially judge whether the voice codecs of the DECT base station match the voice codecs of the handset according to the first codec information data packet, and when the matching is successful, the handset receives a response information sent by the DECT base station to perform voice communication with the DECT base station through the matched voice codecs.

Further, the handset is further configured to sequentially judge whether the voice codecs of the handset match the voice codecs of the DECT base station according to the second codec information data packet sent by the DECT base station, and when the matching is successful, send a response information to the DECT base station to perform voice communication with the DECT base station through the matched voice codecs.

Further, that sequentially judge whether the voice codecs of the DECT base station match the voice codecs of the handset according to the first codec information data packet, specifically is:

according to the first codec information data packet, judge whether the voice codecs of the DECT base station match the voice codec of the handset one by one based on the priority order of the voice codecs of the DECT base station.

Further, that sequentially judge whether the voice codecs of the handset match the voice codecs of the DECT base station according to the second codec information data packet sent by the DECT base station, specifically is:

according to the second codec information data packet, judge whether the voice codecs of the handset match the voice codec of the DECT base station one by one based on the priority order of the voice codecs of the handset.

Further, the first codec information data packet is a data packet including the information of the voice codecs of the handset sent by the handset when the handset is turned on or when the communication is established.

Further, the second codec information data packet is a data packet including the information of the voice codecs of the DECT base station sent by the DECT base station when the DECT base station is turned on or when the communication is established.

In the third aspect, an embodiment of the present disclosure provides a communication system which comprises at least one DECT base station described above and multiple handsets described above.

Compared with the prior art, the embodiments of the disclosure have the following beneficial effects.

The embodiments of the disclosure provide a DECT base station installed with at least two voice codecs. When receiving the first codec information data packet sent by the handset, the DECT base station can sequentially judge whether the voice codecs of the DECT base station match the voice codec of the handset according to the first codec information data packet. And when the matching is successful, that is, when one of the voice codecs of the DECT base station which are matching the voice codecs of the handset is sequentially selected out, the DECT base station sends a response information to the handset to perform voice communication with the handset through the matched voice codec. In the embodiments of the present disclosure, in the condition of installing voice codecs in the DECT base station, the normal voice communication between the DECT base station and the handset can be guaranteed.

DETAILED DESCRIPTION

In the following, the technical solutions in the embodiments of the present application will be clearly and completely described with reference to the drawings in the embodiments of the present application. Apparently, the described embodiments are merely a part of the embodiments of the present disclosure, but not all embodiments. Based on the embodiments of the present disclosure, all other embodiments obtained by a person of ordinary skill in the art without creative efforts shall fall within the protection scope of the present disclosure.

Figure 1:
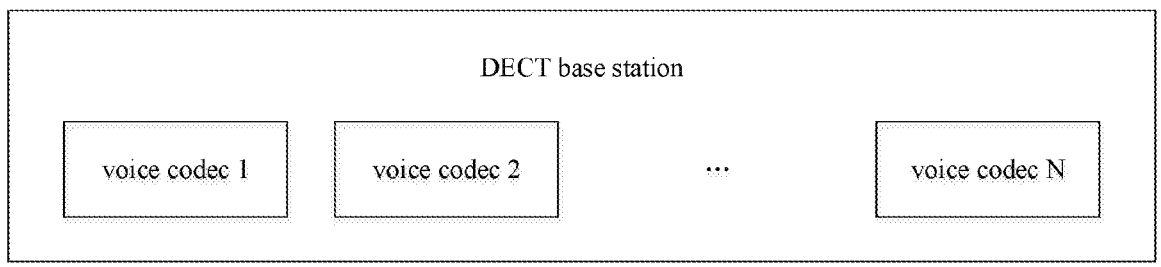
FIG. 1 is a structure diagram of a DECT base station in the first embodiment of the present disclosure.

Please refer to FIG. 1.

As shown in FIG. 1, the first embodiment provides a DECT base station which is installed with two voice codecs. The DECT base station is configured to sequentially judge whether the voice codecs of the DECT base station match the voice codec of the handset according to the first codec information data packet sent by the handset, and when the matching is successful, send a response information to the handset to perform voice communication with the handset through the matched voice codec.

In a preferred embodiment, the DECT base station is further configured to send the second codec information data packet to the handset, enable the handset to sequentially judge whether the voice codecs of the handset match the voice codec of the DECT base station according to the second codec information data packet, and when the matching is successful, receive a response information sent by the handset to perform voice communication with the handset through the matched voice codec.

Wherein, the first codec information data packet is a data packet including the information of the voice codecs of the handset sent by the handset when the handset is turned on or when the communication is established. That is, the first codec information data packet includes the PTP (Peer To Peer) messages of the information of the voice codecs of the handset. Wherein, the PTP messages are the messages transmitted between the DECT base station and the handset in the network layer based on the OSI protocol in the DECT communication filed. The second codec information data packet is a data packet including the information of the voice codecs of the DECT base station sent by the DECT base station when the DECT base station is turned on or when the communication is established. That is, the second codec information data packet includes the PTP (Peer To Peer) messages of the information of the voice codecs of the DECT base station. Wherein, the PTP messages are the messages transmitted between the DECT base station and the handset in the network layer based on the OSI protocol in the DECT communication filed.

Taking the DECT base station installed with two voice codecs G722 and G726 as an example.

When receiving the first codec information data packet sent by the handset, the DECT base station extracts the relevant information of the voice codec of the handset according to the first codec information data packet, and judges whether the voice codecs of the DECT base station match the voice codec of the handset according to a pre-defined judgment order. For example, the DECT base station first judges whether G722 matches the voice codec of the handset, then when G722 doesn't match the voice codec of the handset, the DECT base station judges whether G726 matches the voice codec of the handset, and when the matching of G722 or G726 is successful, the DECT base station sends a relevant information including G722 or G726 to the handset as a response information to perform voice communication with the handset through G722 or G726.

Wherein, when judging whether G722 matches the voice codec of the handset, if the handset is installed with G722, judging the matching of G722 is successful, and sending a relevant information including G722 to the handset as a response information to perform voice communication with the handset through G722. At this time, it is no longer judged whether G726 matches the voice codec of the handset. If the handset is not installed with G722, then judging whether G726 matches the voice codec of the handset.

When judging whether G726 matches the voice codec of the handset, if the handset is installed with G726, judging the matching of G726 is successful, and sending a relevant information including G726 to the handset as a response information to perform voice communication with the handset through G726. If the handset is not installed with G726, then it is determined that both G722 and G726 fail to match. And at this time, the DECT base station cannot perform voice communication with the handset.

Taking the DECT base station installed with three voice codecs OPUS, G722 and G726 as an example.

When receiving the first codec information data packet sent by the handset, the DECT base station extracts a relevant information of the voice codecs of the handset from the first codec information data packet according to the first codec information data packet, and judges whether the voice codecs of the DECT base station match the voice codec of the handset according to a pre-defined judgment order. For example, the DECT base station first judges whether OPUS matches the voice codec of the handset, and when OPUS doesn't match the voice codec of the handset, the DECT base station judges whether G722 matches the voice codec of the handset, then when G722 doesn't match the voice codec of the handset, the DECT base station judges whether G726 matches the voice codec of the handset. When the matching of OPUS or G722 or G726 is successful, the DECT base station sends a relevant information including OPUS or G722 or G726 to the handset as a response information to perform voice communication with the handset through OPUS or G722 or G726.

Wherein, when judging whether OPUS matches the voice codec of the handset, if the handset is installed with OPUS, judging the matching of OPUS is successful, and sending a relevant information including OPUS to the handset as a response information to perform voice communication with the handset through OPUS. At this time, it is no longer judged whether G722 and G726 match the voice codec of the handset. If the handset is not installed with OPUS, then judging whether G722 matches the voice codec of the handset.

When judging whether G722 matches the voice codec of the handset, if the handset is installed with G722, judging the matching of G722 is successful, and sending a relevant information including G722 to the handset as a response information to perform voice communication with the handset through G722. At this time, it is no longer judged whether G726 matches the voice codec of the handset. If the handset is not installed with G722, then judging whether G726 matches the voice codec of the handset.

When judging whether G726 matches the voice codec of the handset, if the handset is installed with G726, judging the matching of G726 is successful, and sending a relevant information including G726 to the handset as a response information to perform voice communication with the handset through G726. If the handset isn't installed with G726, then it is determined that OPUS, G722 and G726 fail to match. And at this time, the DECT base station cannot perform voice communication with the handset.

The embodiment provides a DECT base station installed with at least two voice codecs, and when receiving the first codec information data packet sent by the handset, the DECT base station can sequentially judge whether the voice codecs of the DECT base station match the voice codec of the handset according to the first codec information data packet. And when the matching is successful, that is, when one of the voice codecs of the DECT base station which are matching the voice codecs of the handset is sequentially selected out, the DECT base station sends a response information to the handset to perform voice communication with the handset through the matched voice codec. In this embodiment, in the condition of installing voice codecs in the DECT base station, the normal voice communication between the DECT base station and the handset can be guaranteed.

In a preferred embodiment, that sequentially judging whether the voice codecs of the DECT base station match the voice codec of the handset according to the first codec information data packet sent by the handset, specifically is: according to the first codec information data packet, judging whether the voice codecs of the DECT base station match the voice codec of the handset one by one based on the priority order of the voice codecs of the DECT base station.

It should be noted that, the priority order of the voice codecs of the DECT base station is defined in advance according to the performance of the voice codecs and the actual communication requirements. For example, in the actual communication requirements, when the requirement for sound quality is high, the priority order of the voice codecs is set as OPUS-G722-G726, and when the requirement for the number of the handset is high, the priority order of the voice codecs is set as OPUS-G726-G722. Wherein, OPUS supports the broadband voice communication of low bit rate with 32 Kbps, and it can support broadband voice communication of 12-channels at the same time. If considering the interference of channels and the performance of CPU, OPUS can support the broadband voice communication of at least 8-channels. G722 is the broadband voice communication of 64 Kbps bit rate, and without considering the quality of voice, interference of channels and performance of CPU, G722 can support the broadband voice communication of 6-channels. G726 supports narrowband voice communication of low bit rate with 32 Kbps, and without considering the quality of voice, interference of channels and performance of CPU, G726 can support the narrowband voice communication of 12-channels.

The DECT base station in this embodiment judges, according to the first codec information data packet, whether the voice codecs of the DECT base station match the voice codec of the handset one by one based on the priority order of the voice codecs of the DECT base station, so that in the condition of installing voice codecs in the DECT base station, the optimal voice communication between the DECT base station and the handset can be guaranteed.

In a preferred embodiment, that sequentially judging whether the voice codecs of the handset match the voice codec of the DECT base station according to the second codec information data packet, specifically is: according to the second codec information data packet, judging whether the voice codecs of the handset match the voice codec of the DECT base station one by one based on the priority order of the voice codecs of the handset.

It should be noted that the priority order of the voice codecs of the handset is defined in advance according to the performance of the voice codecs and the actual communication requirements.

In this embodiment, the DECT base station sends the second codec information data packet to the handset, enable the handset to judge, according to the second codec information data packet, whether the voice codecs of the handset match the voice codec of the DECT base station one by one based on the priority order of the voice codecs of the handset, so that in the condition of installing voice codecs in the DECT base station, the optimal voice communication between the DECT base station and the handset can be guaranteed.

In a preferred embodiment, the first codec information data packet is a data packet including the information of the voice codecs of the handset sent by the handset when the handset is turned on or when the communication is established.

In this embodiment, the DECT base station receives the first codec information data packet sent by the handset, wherein the first codec information data packet, which is a data packet including the information of the voice codecs of the handset, is sent by the handset when the handset is turned on or when the communication is established, so that the DECT base station can directly extract the relevant information of the voice codecs of the handset from the data packet, and quickly and sequentially judge whether the voice codecs of the DECT base station match the voice codecs of the handset to ensure that the DECT base station can perform normal voice communicate with the handset as soon as possible.

In a preferred embodiment, the second codec information data packet is a data packet including the information of the voice codecs of the DECT base station sent by the DECT base station when the DECT base station is turned on or when the communication is established.

In this embodiment, the DECT base station sends the second codec information data packet to the handset, wherein the second codec information data packet, which is a data packet including the information of the voice codecs of the DECT base station, is sent by the DECT base station when the DECT base station is turned on or when the communication is established, so that the handset can directly extract the relevant information of the voice codecs of the DECT base station from the data packet, and quickly and sequentially judge whether the voice codecs of the handset match the voice codecs of the DECT base station to ensure that the DECT base station can perform normal voice communicate with the handset as soon as possible.

Figure 2:
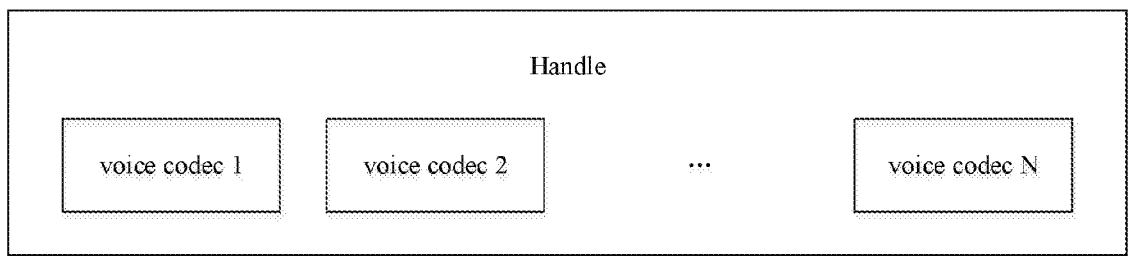
FIG. 2 is a structure diagram of a handset in the second embodiment of the present disclosure.

Please refer to FIG. 2.

As shown in FIG. 2, the second embodiment provides a handset which is installed with at least two voice codecs. The handset is configured to send the first codec information data packet to the DECT base station, enable the DECT base station to sequentially judge whether the voice codecs of the DECT base station match the voice codecs of the handset according to the first codec information data packet, and when the matching is successful, receive a response information sent by the DECT base station to perform voice communication with the DECT base station through the matched voice codecs.

In a preferred embodiment, the handset is further configured to sequentially judge whether the voice codecs of the handset match the voice codecs of the DECT base station according to the second codec information data packet sent by the DECT base station, and when the matching is successful, send a response information to the DECT base station to perform voice communication with the DECT base station through the matched voice codecs.

Wherein, the first codec information data packet is a data packet including the information of the voice codecs of the handset sent by the handset when the handset is turned on or when the communication is established. That is, the first codec information data packet includes the PTP (Peer To Peer) messages of the information of the voice codecs of the handset. Wherein, the PTP messages are the messages transmitted between the DECT base station and the handset in the network layer based on the OSI protocol in the DECT communication filed. The second codec information data packet is a data packet including the information of the voice codecs of the DECT base station sent by the DECT base station when the DECT base station is turned on or when the communication is established. That is, the second codec information data packet includes the PTP (Peer To Peer) messages of the information of the voice codecs of the DECT base station. Wherein, the PTP messages are the messages transmitted between the DECT base station and the handset in the network layer based on the OSI protocol in the DECT communication filed.

Taking the handset installed with two voice codecs G722 and G726 as an example.

The handset sends the first codec information data packet to the DECT base station, so that when receiving the first codec information data packet, the DECT base station extracts a relevant information of G722 and G726 from the first codec information data packet according to the first codec information data packet, and judges whether the voice codecs of the DECT base station match the voice codecs of the handset according to a pre-defined judgment order. For example, the DECT base station first judges whether the first voice codec of the DECT base station matches G722 or G726, and when the first voice codec doesn't match G722 and G726, the DECT base station judges whether the next voice codec matches G722 or G726, until one of the voice codecs of the DECT base station matches G722 or G726, or when the matching of all voice codecs of the DECT base station is finished, and when the matching of G722 or G726 is successful, the handset receives the response information sent by the DECT base station to perform voice communication with the DECT base station through G722 or G726, wherein the response information is a relevant information including G722 or G726.

Wherein, when judging whether the first voice codec of the DECT base station matches G722 or G726, if the first voice codec is G722 or G726, judging the matching of G722 or G726 is successful, and receiving the response information sent by the DECT base station which is a relevant information including G722 or G726, to perform voice communication with the DECT base station through G722 or G726. At this time, it is no longer judged whether the second voice codec matches G722 or G726. If the first voice codec isn't G722 or G726, judging whether the second voice codec matches G722 or G726.

When judging whether the second voice codec matches G722 or G726, if the second voice codec is G722 or G726, judging the matching of G722 or G726 is successful, and receiving the response information sent by the DECT base station which is a relevant information including G722 or G726, to perform voice communication with the DECT base station through G722 or G726. At this time, it is no longer judged whether the third voice codec matches G722 or G726. If the second voice codec isn't G722 or G726, judging whether the third voice codec matches G722 or G726.

And so on, until one of the voice codecs of the DECT base station matches G722 or G726, or the matching of all voice codecs of the DECT base station is finished.

When the matching of all voice codecs of the DECT base station is finished, if all of the voice codecs of the DECT base station are not G722 or G726, it is determined that both G722 and G726 fail to match, and at this time, the handset cannot perform voice communication with the DECT base station.

Taking the handset installed with three voice codecs OPUS, G722 and G726 as an example.

The handset sends the first codec information data packet to the DECT base station, so that when receiving the first codec information data packet, the DECT base station extracts a relevant information of OPUS, G722 and G726 from the first codec information data packet according to the first codec information data packet, and judges whether the voice codecs of the DECT base station match the voice codecs of the handset according to a pre-defined judgment order. For example, the DECT base station first judges whether the first voice codec of the DECT base station matches OPUS, G722 or G726, and when the first voice codec doesn't match OPUS, G722 and G726, the DECT base station judges whether the next voice codec matches OPUS, G722 or G726, until one of the voice codecs of the DECT base station matches OPUS, G722 or G726, or when the matching of all voice codecs of the DECT base station is finished, and when the matching of OPUS, G722 or G726 is successful, the handset receives the response information sent by the DECT base station to perform voice communication with the DECT base station through OPUS, G722 or G726, wherein the response information is a relevant information including G722 or G726.

Wherein, when judging whether the first voice codec of the DECT base station matches OPUS, G722 or G726, if the first voice codec is OPUS, G722 or G726, judging the matching of OPUS, G722 or G726 is successful, and the handset receives the response information sent by the DECT base station to perform voice communication with the DECT base station through OPUS, G722 or G726. Wherein, the response information is a relevant information including OPUS, G722 or G726. At this time, it is no longer judged whether the second voice codec matches OPUS, G722 or G726. If the first voice codec is not OPUS, G722 or G726, judging whether the second voice codec matches OPUS, G722 or G726.

When judging whether the second voice codec matches OPUS, G722 or G726, if the second voice codec is OPUS, G722 or G726, judging the matching of OPUS, G722 or G726 is successful, and the handset receives the response information sent by the DECT base station to perform voice communication with the DECT base station through OPUS, G722 or G726. Wherein, the response information is a relevant information including OPUS, G722 or G726. At this time, it is no longer judged whether the third voice codec matches OPUS, G722 or G726. If the second voice codec is not OPUS, G722 or G726, judging whether the third voice codec matches OPUS, G722 or G726.

And so on, until one of the voice codecs of the DECT base station matches OPUS, G722 or G726, or the matching of all voice codecs of the DECT base station is finished.

When the matching of all voice codecs of the DECT base station is finished, if all of the voice codecs of the DECT base station are not OPUS, G722 or G726, it is determined that the matching of OPUS, G722 or G726 is failed, and at this time, the handset cannot perform voice communication with the DECT base station.

The embodiment provides a handset installed with at least two voice codecs, and the handset sends the first codec information data packet to the DECT base station, so that when receiving the first codec information data packet, the DECT base station can sequentially judge whether the voice codecs of the DECT base station match the voice codec of the handset according to the first codec information data packet. And when the matching is successful, that is, when one of the voice codecs of the DECT base station which are matching the voice codec of the handset is sequentially selected out, the handset receives the response information sent by the DECT base station to perform voice communication with the DECT base station through the matched voice codec. In this embodiment, in the condition of installing voice codecs in the handset, the normal voice communication between the DECT base station and the handset can be guaranteed.

In a preferred embodiment, that sequentially judging whether the voice codecs of the DECT base station match the voice codec of the handset according to the first codec information data packet, specifically is: according to the first codec information data packet, judging whether the voice codecs of the DECT base station match the voice codec of the handset one by one based on the priority order of the voice codecs of the DECT base station.

It should be noted that, the priority order of the voice codecs of the DECT base station is defined in advance according to the performance of the voice codecs and the actual communication requirements. For example, in the actual communication requirements, when the requirement for sound quality is high, the priority order of the voice codecs is set as OPUS-G722-G726, and when the requirement for the number of the handset is high, the priority order of the voice codecs is set as OPUS-G722-G726. Wherein, OPUS supports the broadband voice communication of low bit rate with 32 Kbps, and it can support broadband voice communication of 12-channels at the same time. Considering the interference of channels and the performance of CPU, OPUS can support the broadband voice communication of at least 8-channels. G722 is the broadband voice communication of 64 Kbps bit rate, and without considering the quality of voice, interference of channels and performance of CPU, G722 can support the broadband voice communication of 6-channels. G726 supports narrowband voice communication of low bit rate with 32 Kbps, and without considering the quality of voice, interference of channels and performance of CPU, G726 can support the narrowband voice communication of 12-channels.

In this embodiment, the handset sends the first codec information data packet to the DECT base station, enable the DECT base station to judge, according to the first codec information data packet, whether the voice codecs of the DECT base station match the voice codec of the handset one by one based on the priority order of the voice codecs of the DECT base station, so that in the condition of installing voice codecs in the handset, the optimal voice communication between the handset and the DECT base station can be guaranteed.

In a preferred embodiment, that sequentially judging whether the voice codecs of the handset match the voice codec of the DECT base station according to the second codec information data packet sent by the DECT base station, specifically is: according to the second codec information data packet, judging whether the voice codecs of the handset match the voice codec of the DECT base station one by one based on the priority order of the voice codecs of the handset.

It should be noted that the priority order of the voice codecs of the handset is defined in advance according to the performance of the voice codecs and the actual communication requirements.

In this embodiment, the handset judges, according to the second codec information data packet, whether the voice codecs of the handset match the voice codec of the DECT base station one by one based on the priority order of the voice codecs of the handset, so that in the condition of installing voice codecs in the handset, the optimal voice communication between the handset and the DECT base station can be guaranteed.

In a preferred embodiment, the first codec information data packet is a data packet including the information of the voice codecs of the handset sent by the handset when the handset is turned on or when the communication is established.

In this embodiment, the handset sends the first codec information data packet to the DECT base station, enable the DECT base station to directly extract the relevant information of the voice codecs of the handset from the data packet, and quickly and sequentially judge whether the voice codecs of the DECT base station match the voice codecs of the handset to ensure that the handset performs normal voice communicate with the DECT base station as soon as possible. Wherein, the first codec information data packet is a data packet including the information of the voice codecs of the handset sent by the handset when the handset is turned on or when the communication is established.

In a preferred embodiment, the second codec information data packet is a data packet including the information of the voice codecs of the DECT base station sent by the DECT base station when the DECT base station is turned on or when the communication is established.

In this embodiment, the handset receives the second codec information data packet sent by the DECT base station, and can directly extract the relevant information of the voice codecs of the DECT base station from the data packet, and quickly and sequentially judge whether the voice codecs of the handset match the voice codecs of the DECT base station to ensure that the handset performs normal voice communicate with the DECT base station as soon as possible. Wherein, the second codec information data packet is a data packet including the information of the voice codecs of the DECT base station sent by the DECT base station when the DECT base station is turned on or when the communication is established.

Figure 3:
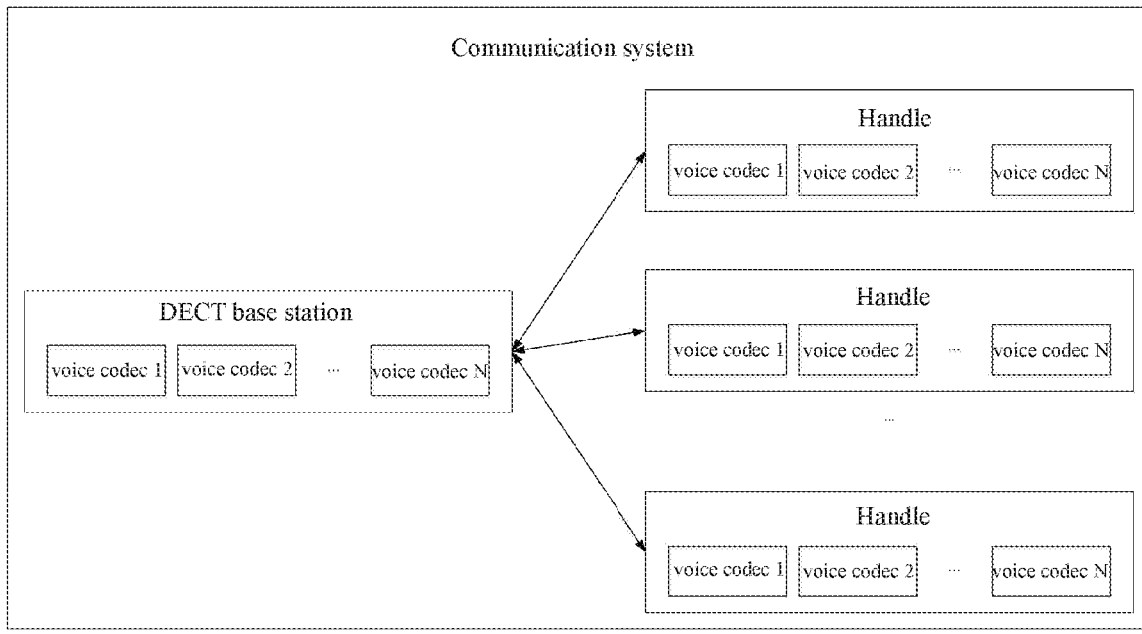
FIG. 3 is a structure diagram of a communication system in the third embodiment of the present disclosure.
Figure 4:
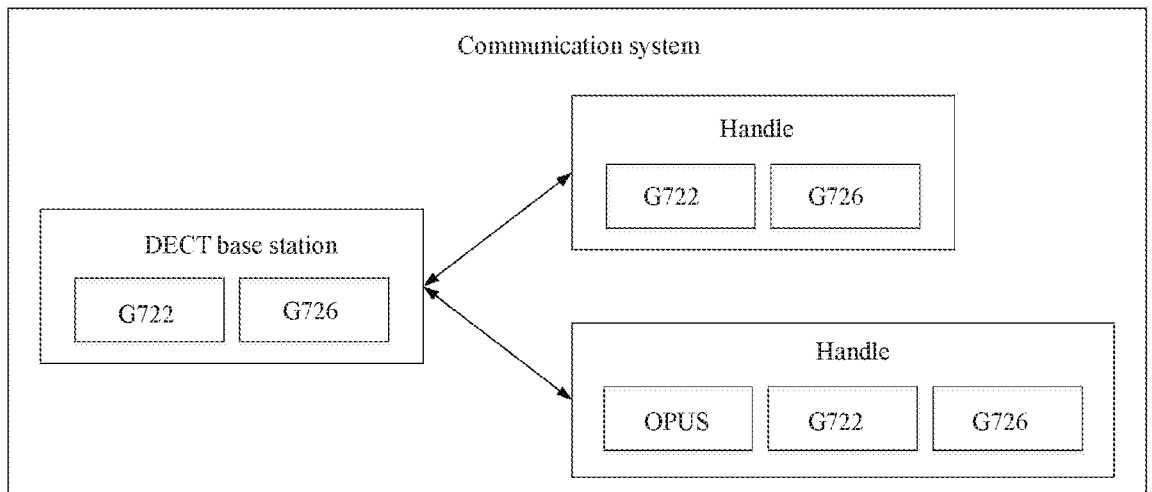
FIG. 4 is a structure diagram of an example communication system in the third embodiment of the present disclosure.
Figure 5:
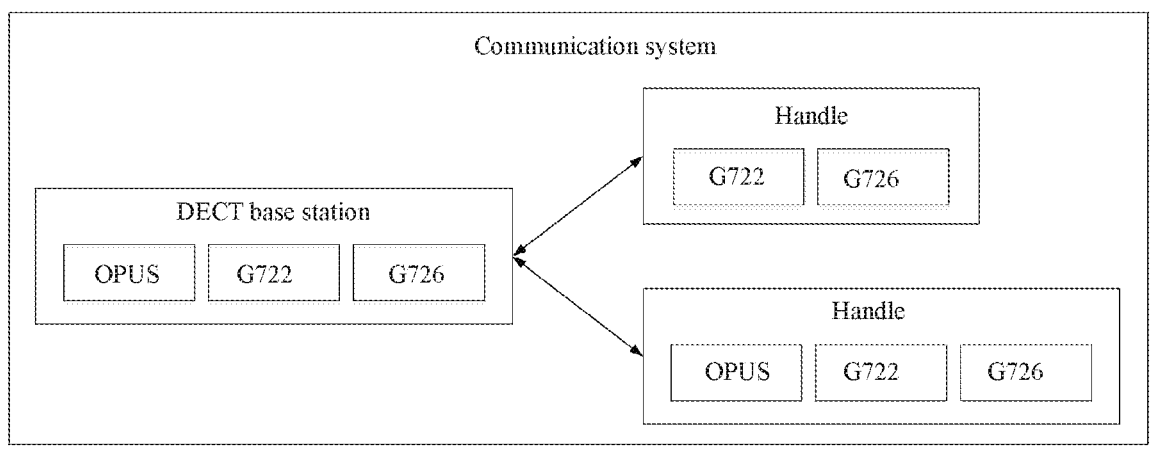
FIG. 5 is a structure diagram of another example communication system in the third embodiment of the present disclosure.

Please refer to FIGS. 3-5.

As shown in FIG. 3, the third embodiment provides a communication system. The communication system comprises at least one DECT base station described in the first embodiment and multiple handsets described in the second embodiment.

As shown in FIG. 4, taking the DECT base station installed with two voice codecs G722 and G726 as an example.

When receiving the first codec information data packet sent by the handset, the DECT base station extracts the relevant information of the voice codec of the handset from the first codec information data packet according to the first codec information data packet, and judges whether the voice codecs of the DECT base station match the voice codec of the handset according to a pre-defined judgment order. For example, the DECT base station first judges whether G722 matches the voice codec of the handset, then when G722 doesn't match the voice codec of the handset, the DECT base station judges whether G726 matches the voice codec of the handset, and when the matching of G722 or G726 is successful, the DECT base station sends a relevant information including G722 or G726 to the handset as a response information to perform voice communication with the handset through G722 or G726.

Wherein, when judging whether G722 matches the voice codec of the handset, if the handset is installed with G722, judging the matching of G722 is successful, and sending a relevant information including G722 to the handset as a response information to perform voice communication with the handset through G722. At this time, it is no longer judged whether G726 matches the voice codec of the handset. If the handset is not installed with G722, judging whether G726 matches the voice codec of the handset.

When judging whether G726 matches the voice codec of the handset, if the handset is installed with G726, judging the matching of G726 is successful, and sending a relevant information including G726 to the handset as a response information to perform voice communication with the handset through G726. If the handset is not installed with G726, then it is determined that both G722 and G726 fail to match. And at this time, the DECT base station cannot perform voice communication with the handset.

Taking the DECT base station installed with three voice codecs OPUS, G722 and G726 as an example.

When receiving the first codec information data packet sent by the handset, the DECT base station extracts a relevant information of the voice codecs of the handset from the first codec information data packet according to the first codec information data packet, and judges whether the voice codecs of the DECT base station match the voice codecs of the handset according to a pre-defined judgment order. For example, the DECT base station first judges whether OPUS matches the voice codec of the handset, and when OPUS doesn't match the voice codec of the handset, the DECT base station judges whether G722 matches the voice codec of the handset, then when G722 doesn't match the voice codec of the handset, the DECT base station judges whether G726 matches the voice codec of the handset. When the matching of OPUS or G722 or G726 is successful, the DECT base station sends a relevant information including OPUS or G722 or G726 to the handset as a response information to perform voice communication with the handset through OPUS or G722 or G726.

Wherein, when judging whether OPUS matches the voice codec of the handset, if the handset is installed with OPUS, judging the matching of OPUS is successful, and sending a relevant information including OPUS to the handset as a response information to perform voice communication with the handset through OPUS. At this time, it is no longer judged whether G722 and G726 match the voice codec of the handset. If the handset is not installed with OPUS, then judging whether G722 matches the voice codec of the handset.

When judging whether G722 matches the voice codec of the handset, if the handset is installed with G722, judging the matching of G722 is successful, and sending a relevant information including G722 to the handset as a response information to perform voice communication with the handset through G722. At this time, it is no longer judged whether G726 matches the voice codec of the handset. If the handset is not installed with G722, then judging whether G726 matches the voice codec of the handset.

When judging whether G726 matches the voice codec of the handset, if the handset is installed with G726, judging the matching of G726 is successful, and sending a relevant information including G726 to the handset as a response information to perform voice communication with the handset through G726. If the handset is not installed with G726, then it is determined that OPUS, G722 and G726 fail to match. And at this time, the DECT base station cannot perform voice communication with the handset.

The embodiment provides a communication system. The communication system comprises at least one DECT base station installed with at least two voice codecs and multiple handsets installed with at least two voice codecs. When receiving the first codec information data packet sent by the handset, the DECT base station can sequentially judge whether the voice codecs of the DECT base station match the voice codec of the handset according to the first codec information data packet. And when the matching is successful, that is, when one of the voice codecs of the DECT base station which are matching the voice codecs of the handset is sequentially selected out, the DECT base station sends a response information to the handset to perform voice communication with the handset through the matched voice codec. In this embodiment, in the condition of installing voice codecs in the DECT base station and/or the handset, the normal voice communication between the DECT base station and the handset can be guaranteed.

In a summary, when the embodiment of the disclosure is implemented, the following beneficial effects are produced.

The embodiments of the disclosure provide a DECT base station installed with at least two voice codecs. When receiving the first codec information data packet sent by the handset, the DECT base station can sequentially judge whether the voice codecs of the DECT base station match the voice codec of the handset according to the first codec information data packet. And when the matching is successful, that is, when one of the voice codecs of the DECT base station which are matching the voice codecs of the handset is sequentially selected out, the DECT base station sends a response information to the handset to perform voice communication with the handset through the matched voice codec. In this embodiment, in the condition of installing voice codecs in the DECT base station, the normal voice communication between the DECT base station and the handset can be guaranteed.

The above-mentioned embodiments are the preferred embodiments of the present disclosure. Variations and modifications are allowed within the scope of the disclosure. Those skilled in the art will appreciate that the features described above can be combined in various ways to form multiple variations of the disclosure. As a result, such variations fall within the scope of the protection to the present disclosure.

The invention claimed is:

1. A Digital Enhanced Cordless Telecommunications (DECT) base station, wherein the DECT base station is installed with at least two different voice codecs; and
the DECT base station is configured to sequentially judge whether the voice codecs of the DECT base station match voice codecs of a handset according to a first codec information data packet sent by the handset, and when a matching is successful, send a response information to the handset to perform voice communication with the handset through a matched voice codec;
wherein a priority order of the voice codecs of the DECT base station is defined in advance according to performance of the voice codecs and actual communication requirements; the priority order of the voice codecs of the handset is defined in advance according to the performance of the voice codecs and the actual communication requirements;
wherein that sequentially judge whether the voice codecs of the DECT base station match the voice codecs of the handset according to the first codec information data packet sent by the handset, specifically is:
according to the first codec information data packet, judge whether a first voice codec of the DECT base station matches the voice codecs of the handset based on the priority order of the voice codecs of the DECT base station, when the first voice codec is successfully matched, the DECT base station sends a response information including the first voice codec to the handset to perform voice communication with the handset through the first voice codec, and it is no longer judged whether a next voice codec of the DECT base station matches the voice codecs of the handset; when the first voice codec doesn't match the voice codecs of the handset, judge whether the next voice codec of the DECT base station matches the voice codecs of the handset, until one of the voice codecs of the DECT base station matches the voice codecs of the handset, or the matching of each voice codec of the DECT base station is finished; when one of the voice codecs of the DECT base station is successfully matched, the DECT base station sends a response information including the one of the voice codecs of the DECT base station to the handset to perform voice communication with the handset through the one of the voice codecs of the DECT base station, and it is no longer judged whether the next voice codec of the DECT base station matches the voice codecs of the handset; when the matching of each voice codec of the DECT base station is failed, determine that the handset cannot perform voice communication with the DECT base station.

2. The DECT base station according to claim 1, wherein the DECT base station is further configured to send a second codec information data packet to the handset, enable the handset to sequentially judge whether the voice codecs of the handset match the voice codecs of the DECT base station according to the second codec information data packet, and when a matching is successful, receive a response information sent by the handset to perform voice communication with the handset through a matched voice codec.

3. The DECT base station according to claim 2, wherein that sequentially judge whether the voice codecs of the handset match the voice codecs of the DECT base station according to the second codec information data packet, specifically is:
according to the second codec information data packet, judge whether the voice codecs of the handset match the voice codecs of the DECT base station one by one based on the priority order of the voice codecs of the handset.

4. The DECT base station according to claim 1, wherein the first codec information data packet is a data packet including information of the voice codecs of the handset sent by the handset when the handset is turned on or when the communication is established.

5. The DECT base station according to claim 2, wherein the second codec information data packet is a data packet including information of the voice codecs of the DECT base station sent by the DECT base station when the DECT base station is turned on or when the communication is established.

6. A communication system, wherein the communication system comprises at least one DECT base station and multiple handsets;
wherein the DECT base station is installed with at least two different voice codecs; and
the DECT base station is configured to sequentially judge whether the voice codecs of the DECT base station match voice codecs of a handset according to a first codec information data packet sent by the handset, and when a matching is successful, send a response information to the handset to perform voice communication with the handset through a matched voice codec;
wherein a priority order of the voice codecs of the DECT base station is defined in advance according to performance of the voice codecs and actual communication requirements; the priority order of the voice codecs of the handset is defined in advance according to the performance of the voice codecs and the actual communication requirements;
wherein that sequentially judge whether the voice codecs of the DECT base station match the voice codecs of the handset according to the first codec information data packet sent by the handset, specifically is:
according to the first codec information data packet, judge whether a first voice codec of the DECT base station matches the voice codecs of the handset based on the priority order of the voice codecs of the DECT base station, when the first voice codec is successfully matched, the DECT base station sends a response information including the first voice codec to the handset to perform voice communication with the handset through the first voice codec, and it is no longer judged whether a next voice codec of the DECT base station matches the voice codecs of the handset; when the first voice codec doesn't match the voice codecs of the handset, judge whether the next voice codec of the DECT base station matches the voice codecs of the handset, until one of the voice codecs of the DECT base station matches the voice codecs of the handset, or the matching of each voice codec of the DECT base station is finished; when one of the voice codecs of the DECT base station is successfully matched, the DECT base station sends a response information including the one of the voice codecs of the DECT base station to the handset to perform voice communication with the handset through the one of the voice codecs of the DECT base station, and it is no longer judged whether the next voice codec of the DECT base station matches the voice codecs of the handset; when the matching of each voice codec of the DECT base station is failed, determine that the handset cannot perform voice communication with the DECT base station;

wherein the handset is installed with at least two voice codecs; and the handset is configured to send a first codec information data packet to a DECT base station, enable the DECT base station to sequentially judge whether voice codecs of the DECT base station match the voice codecs of the handset according to the first codec information data packet, and when a matching is successful, receive a response information sent by the DECT base station to perform voice communication with the DECT base station through a matched voice codec;

wherein that sequentially judge whether the voice codecs of the DECT base station match the voice codecs of the handset according to the first codec information data packet, specifically is:

according to the first codec information data packet, judge whether a first voice codec of the DECT base station matches the voice codecs of the handset based on the priority order of the voice codecs of the DECT base station, when the first voice codec is successfully matched, the DECT base station sends a response information including the first voice codec to the handset to perform voice communication with the handset through the first voice codec, and it is no longer judged whether a next voice codec of the DECT base station matches the voice codecs of the handset; when the first voice codec doesn't match the voice codecs of the handset, judge whether the next voice codec of the DECT base station matches the voice codecs of the handset, until one of the voice codecs of the DECT base station matches the voice codec of the handset, or the matching of each voice codec of the DECT base station is finished; when one of the voice codecs of the DECT base station is successfully matched, the DECT base station sends a response information including the one of the voice codecs of the DECT base station to the handset to perform voice communication with the handset through the one of the voice codecs of the DECT base station, and it is no longer judged whether the next voice codec of the DECT base station matches the voice codecs of the handset; when the matching of each voice codec of the DECT base station is failed, determine that the handset cannot perform voice communication with the DECT base station.

* * * * *